3,429,890
CERTAIN 2-THIAZOLYLBENZIMIDAZOLE-1-OXY DERIVATIVES

Meyer Sletzinger, North Plainfield, and Dale R. Hoff, Cranford, N.J., assignors to Merck & Co., Inc., Rahway, N.J., a corporation of New Jersey
No Drawing. Continuation-in-part of application Ser. No. 422,543, Dec. 31, 1964. This application Oct. 14, 1965, Ser. No. 495,769
U.S. Cl. 260—302    4 Claims
Int. Cl. C07d 49/38, 91/30

ABSTRACT OF THE DISCLOSURE

Water soluble anthelmintically active 1-ether benzimidazole derivatives are prepared by treating the corresponding benzimidazole 1-oxide under basic conditions with an alkylating agent selected from the group consisting of alkyl halides and dialkyl sulfates.

---

This is a continuation-in-part of application Ser. No. 422,543, filed Dec. 31, 1964, now abandoned.

This invention relates generally to new chemical compounds. More particularly, it relates to derivatives of heterocyclic compounds. Still more specifically, it is concerned with 2-substituted benzimidazoles which have an ether group attached at the 1-position thereof. It is concerned further with the methods of making such compounds. It is also concerned with the use of such compounds and compositions containing them in the treatment and prevention of helminthiasis.

The infection known as helminthiasis involves infestation with various species of parasitic worms of the animal body, particularly the gastrointestinal tract. It is one objective of the present invention to provide novel compounds. It is a further object to provide methods of synthesizing such compounds. It is a still further object of this invention to provide a method for preparing anthelmintic compositions containing such compounds. It is another object of this invention to provide a group of substituted 1-ether benzimidazoles which are effective in controlling helminthiasis. Other objects will become apparent from the following description of the invention.

Among the helmintic parasites, the nematodes of the genera Haemonchus, Trichostrongylus, Ostertagia, Nematodirus, Cooperia, Bunostomum, Oesophagostomum, Chabertia, Trichuris, Ascaris, Capillaria, Heterakis and Ancylostoma are the most common parasites of domestic animals. The disease attributable to such infections, such as ascariasis, trichostrongylosis and gross parasitism, are widespread and serious, the diseased host usually suffering from such conditions as malnutrition, anemia and hemorrhaging. Moreover, more advanced and uncontrolled cases of helminthiasis can lead to prostration and death.

According to the instant invention, it has now been found that certain 1-ether benzimidazoles substituted at the 2-position with a heteroaromatic group containing nitrogen, oxygen and/or sulfur as a hetero atom or an aryl or orthohalophenyl radical and more particularly those 1-ether benzimidazoles also having at the 5- or 6-position hydrogen, loweralkyl, halo, phenyl, halophenyl, heterocyclic, ether or thioether radicals have anthelmintic activity. Moreover, these 1-ether benzimidazoles are more soluble in water than the corresponding 1-unsubstituted compounds and are accordingly more readily usable in aqueous carriers.

The new and novel compounds within the scope of this invention may be represented by the formula

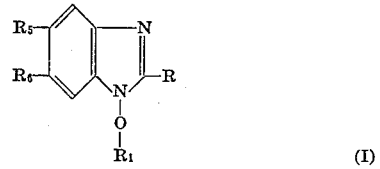

where R is an aryl radical such as phenyl or naphthyl, an orthohaloaryl radical or a heteroaromatic radical containing from 1–3 hetero atoms, wherein the hetero atoms are nitrogen, oxygen, or sulfur. As illustrative of the orthohaloaryl radicals which may be found at the 2-position on these novel compounds, there may be mentioned o-fluorophenyl, o-chlorophenyl, o-fluoronaphthyl, and the like. The heteroaromatic radicals at the 2-position are those having one hetero atom in the ring structure such as thienyl, furyl, pyrryl, pyridyl, coumarinyl or thiacoumarinyl, two hetero atoms in the ring such as a thiazolyl or isothiazolyl, or three hetero atoms such as thiadiazolyl. The preferred compounds of the invention are those wherein the 2-substituent contains nitrogen and sulphur as hetero atoms, e.g. thiazolyl, isothiazolyl and thiadiazolyl.

The definition of $R_1$ is an important feature of this invention. This symbol represents a loweralkyl radical such as methyl, ethyl, propyl, isopropyl, butyl, pentyl, and the like; cycloalkyl groups such as cyclopentyl, cyclohexyl and the like; and substituted loweralkyl groups such as carboxyloweralkyl, i.e. carboxymethyl and carboxyethyl and the like, hydroxyloweralkyl where the loweralkyl moiety is other than methyl such as β-hydroxyethyl and α-hydroxybutyl and the like, and haloloweralkyl groups such as chloromethyl, fluoromethyl, β-chloroethyl, and the like. Other substituted loweralkyl groups represented by $R_1$ include loweralkyl esters of loweralkanoic acids such as carbomethoxymethyl, carboethoxymethyl, β-carbomethoxyethyl and the like, aminoloweralkyl or acetomidoloweralkyl where the loweralkyl moiety is other than methyl such as aminoethyl, acetamidoethyl, and the like, sulfonamidoloweralkyl where the loweralkyl moiety is other than methyl such as methanesulfonamidoethyl, toluenesulfonamidoethyl and the like, loweralkylaminoloweralkyl, i.e. N-ethylaminoethyl, N-methylaminoethyl and the like, and diloweralkylaminoloweralkyl such as diethylaminoethyl, dimethylaminoethyl and the like, the loweralkyl moiety attached to the oxygen atom in the two latter generic substituted aminoalkyl groups being other than methyl. Additionally, $R_1$ represents an aralkyl group such as benzyl and phenethyl and the like, and substituted aralkyl groups such as haloaralkyl, i.e. 2-chlorobenzyl, 4-fluorobenzyl, and the like, nitroaralkyl such as 4-nitrobenzyl and the like, loweralkylaralkyl such as 4-ethylbenzyl and the like, aminoaralkyl or acetamidoaralkyl such as 4-aminobenzyl, 4-acetomidobenzyl, 2-aminobenzyl and the like, and sulfonamidoaralkyl such as methanesulfonamidobenzyl, benzenesulfonamidobenzyl and the like. Accordingly, $R_1$ represents loweralkyl, cycloalkyl, carboxyloweralkyl, haloloweralkyl, carbolower-alkoxyalkyl, aralkyl, haloaralkyl, nitroaralkyl, loweralk-ylaralkyl, aminoaralkyl, sulfonamidoaralkyl, or $(CH_2)_nX$ where $n$ is 2–5 and X is hydroxy, amino, loweralkylamino, diloweralkylamino or sulfonamindo.

$R_5$ and $R_6$ may represent hydrogen or halo, for example chlorine or fluorine. One of $R_5$ and $R_6$ may be alkyl, preferably loweralkyl such as methyl, ethyl, isopropyl and the like, phenyl, or a halophenyl group having a halo radical, for example fluoro or chloro, located ortho, meta or para with respect to the phenyl carbon linking the halophenyl group to the benzimidazole moiety. Examples of such halophenyl groups include p-fluorophenyl, p-chlorophenyl, o-fluorophenyl, m-fluorophenyl, and the like. $R_5$ and $R_6$ but not both at any one time, also represent a heterocyclic radical such as thienyl and the like, a loweralkoxy or loweralkylthio group such as methoxy, ethoxy, methylthio, propylthio and the like, or a phenoxy or phenylthio group. Accordingly, $R_5$ and $R_6$ represent hydrogen, loweralkyl, loweralkoxy, loweralkylthio, phenoxy, phenylthio, halo, phenyl, halophenyl or thienyl, provided that when $R_5$ and $R_6$ are other than halo, at least one of $R_5$ and $R_6$ is hydrogen.

As illustrative of the novel 1-ether benzimidazoles falling within the scope of our invention and which may be prepared according to the methods described hereinbelow, there may be mentioned 1-methoxy-2-(4'-thiazolyl)-benzimidazole,
1-methoxy-2-(4'-thiazolyl)-5-phenyl benzimidazole,
1-ethoxy-2-(2'-thiazolyl)-5-fluoro benzimidazole,
1-chloro-n-propoxy-2-(2'-furyl)-5-(2'-thienyl)-benzimidazole,
1-methoxy-2-(2'-thienyl)-benzimidazole,
1-N-ethylaminoethoxy-2-(2'-pyrryl)-benzimidazole,
1-isopropoxy-2-(4'-thiazolyl)-6-chloro-benzimidazole,
1-hydroxypropoxy-2-[4'-(1',2',5'-thiazolyl)]-5-methyl benzimidazole,
1-methoxy-2-(2'-pyrryl)-5-methylthiobenzimidazole,
1-methoxy-2-(2'-thiazolyl)-benzimidazole,
1-ethoxy-2-(3'-thienyl)-5-phenyl benzimidazole,
1-methoxy-2-(4'-thiazolyl)-6-phenoxy benzimidazole,
1-n-propoxy-2-(3'-pyridyl)-5-fluoro benzimidazole,
1-methoxy-2-(3'-thiacoumarinyl)-benzimidazole,
1-methoxy-2-phenyl-5-(p-fluorophenyl)-benzimidazole,
1-ethoxy-2-(4'-thiazolyl)-5-(p-fluorophenyl)-benzimidazole,
1-benzyloxy-2-(4'-thiazolyl)-benzimidazole,
1-(4'-aminobenzyloxy)-2-(2'-thiazolyl)-5-phenyl benzimidazole,
1-hydroxyethoxy-2-(2'-thienyl)-benzimidazole,
1-N methylaminoethoxy-2-[4'-(1',2',5'-thiadiazolyl)]-benzimidazole,
1-carbomethoxymethoxy-2-phenyl-5-methyl benzimidazole,
1-chloromethoxy-2-(4'-fluorophenyl)-5-phenoxy benzimidazole,
1-(2'-nitrobenzyloxy)-2-(4'-thiazolyl)-benzimidazole, and the like.

In accordance with an additional aspect of this invention, it has now been found that the 1-ether benzimidazoles of Formula I are obtained when compounds of the formula

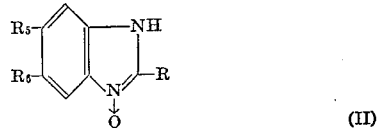

(II)

where R, $R_5$ and $R_6$ are as defined above, are treated in a suitable solvent with a base and a compound of the formula $R_1$–B where $R_1$ is as defined above and B is halo e.g. chloro, bromo and iodo or a sulfonyloxy group such as benzene sulfonyloxy, toluenesulfonyloxy, methanesulfonyloxy and the like. Bases useful in this process include the strong inorganic bases, for example alkali metal hydroxides such as sodium hydroxide and potassium hydroxide, alkali metal alkoxides such as sodium methoxide, and potassium methoxide and the like, Grignard reagents such as loweralkyl magnesium halides, e.g. methyl magnesium bromide, ethyl magnesium chloride and the like, and alkali metal amides such as potassium, lithium and sodium amides, and the like. The product obtained after treatment of the oxide with the base is the corresponding salt, e.g. the alkali metal salt. The solvents which are useful in preparing the compounds of Formula I include loweralkanols such as methanol, ethanol and the like, and ethers, for example dimethoxyethane, dioxane, tetrahydrofuran and the like. When an amide or a Grignard reagent is used as the base, it is preferred that nonhydroxylic solvents and anhydrous conditions be employed.

In order to obtain the 1-ether benzimidazoles from the salt, halides such as methyl iodide, methyl bromide, methyl chloride, ethyl iodide, β-carboethoxyethyl chloride, benzyl chloride, ethylenechlorohydrin, n-propyl bromide, and the like or sulfonates such as methylbenzenesulfonate, ethyltoluenesulfonate, and the like are used. This alkylation step may be carried out concurrently with the preparation of the salt of the benzimidazole-1-oxide or it may be carried out separately after removal and isolation of the salt. The temperature of the alkylation reaction is not critical but it is preferably carried out at about 40° C. to about 120° C. and conveniently at about 55° C. to about 80° C. Those compounds having carboxy moiety are prepared by treating the salt form obtained with acid. The benzimidazoles having a free amino moiety are obtained from the corresponding 1-acetamido compound by treating the latter with acid or a base such as an alkali metal hydroxide at about 60–100° C. The benzimidazole ether may be isolated and purified by standard techniques such as crystallization and filtration.

It has also been found in accordance with this invention that the 1-loweralkoxy benzimidazoles defined above may be prepared by treating the benzimidazole-1-oxides of Formula II with a dialkyl sulfate such as dimethyl sulfate, diethyl sulfate and the like, according to the process described above. The 1-loweralkoxy, haloloweralkoxy and benzyloxy benzimidazoles are also prepared by this invention in neutral medium from the corresponding benzimidazole-1-oxides when phenyldiazomethane, a diazoloweralkane such as diazomethane, diazoethane and the like, or a halodiazoloweralkane such as 2-chloro-1-diazoethane and the like is used as alkylating agent. The reagent may be dissolved in inert organic solvent such as ethers, for example diethylether, 1,2-dimethoxyethane, tetrahydrofuran and the like, aromatic hydrocarbons such as benzene, toluene, xylene and the like, halogenated hydrocarbons such as chloroform and the like, and loweralkanols such as methanol, ethanol, propanol and the like. The benzimidazole-1-oxide is then conveniently treated with the resulting solution at a temperature preferably from about 0° C. to about room temperature in order that the 1-ether benzimidazole be produced.

The alkylating agents used as starting materials in this invention are known or may be prepared according to methods known in the art. For instance, an aminobenzylol may be prepared from the corresponding nitrobenzyl compound by reduction with hydrogen sulfide. The sulfonamidobenzylhalide starting materials may be prepared by treating aminobenzylol with a sulfonyl halide in the presence of dilute sodium hydyroxide to get the sulfonylaminobenzylol, and treating the product with thionyl chloride. The acetamidobenzylsulfonates are prepared from aminobenzylol with acetic anhydride, treating the diacetate formed with dilute sodium hydroxide and sulfonating the resulting benzylol. The acetamidobenzyl halides are obtained from the above benzylol by treatment with e.g. thionyl chloride.

All the starting materials of the formula $R_1$–B, where $R_1$ is as defined above and B is halo, may be converted to the corresponding sulfonates by hydrolyzing them with dilute alkali and treating the resulting alcohol with a sulfonyl chloride in pyridine.

The 1-ether benzimidazoles of Formula I hereinabove are useful in the treatment and/or prevention of helminthiasis in domesticated animals. For this purpose they may be administered orally with an ingestible carrier as a component of the animal feedstuff, in the drinking water, in salt blocks, and in unit dosage forms such as boluses and drenches. The amount of active ingredient required for optimum control of helminthiasis, of course, varies in accordance with such factors as the particular compound employed, the species of animal to be treated, the species of infecting parasite, the severity of infection, and whether the compound is employed therapeutically or prophylactically. Generally, certain classes of the compounds depicted by Formula I have activities differing from those in other classes. For instance, 1-ether benzimidazoles having a thiazolyl substituent at the 2-position generally exhibit greater activity than those 1-ether benzimidazoles having a different substituent at the 2-position. In general, the compounds defined by Formula I may be administered orally to domestic animals in daily doses of from about 0.1 mg. to about 500 mg. and preferably 15 mg. to 250 mg. per kilogram of body weight. Administration may be in a single dose or divided into a plurality of smaller doses over a period of 24 hours. Where prophylactic treatment is desired and the compounds are fed continuously, satisfactory results are obtained when the animal's ingest daily dosages are from about 0.1 mg. to 100 mg. per kilogram of body weight.

These compounds, when prepared as a unit dosage form such as a capsule, tablet, bolus, drench and the like, may be blended with one or more innocuous orally ingestible ingredients including diluents, fillers, binders, lubricants, disintegrating agents, suspending agents, wetting agents and the like. Suspending agents are particularly valuable when a drench is desired and should be used in such amount as to permit a uniform suspension of the active ingredient in water. Suspending agents such as acacia, tragacanth, Veegum (colloidal magnesium-aluminum silicate, R. E. Vanderbilt Co.), carboxypolymethylene, algins, methylcellulose, hydroxyethylcellulose and others are useful in this regard. The exact quantity of suspending agent to be employed will depend upon the concentration of active anthelmintic ingredient and the particular suspending agent being utilized.

The unit dosage forms may be readily prepared by conventional formulating techniques and are particularly useful when administration is to be made in a single dose or divided doses over a period of 24 hours. In addition to the earlier mentioned ingredients, the solid compositions may also contain a material which when associated with the active ingredient maintains the active ingredient in inert or inoperative form so long as the composition remains in the acidic stomach, but which release the active ingredient when the composition reaches the intenstine. Such compositions, because enteric in character, are particularly useful for the treatment of animals suffering from severe helmintic infection of the intestinal tract. Provision of such enteric property can, for example, be accomplished by coating tablets and boluses in a conventional manner with one of the commonly employed enteric coatings such as those containing fatty acids, resins, waxes, synthetic polymers and the like.

The exact amount of active ingredient to be employed in the above compositions may vary provided that a sufficient amount is ingested to give the required dosage. In general, tablets, boluses and drenches containing from about 5 to 70% by weight of active ingredient may be satisfactorily employed to supply the desired dosage. A typical example of a bolus which may be used in accordance with the teaching of the invention is as follows:

| | Grams |
|---|---|
| 1-methoxy-2-(4'-thiazolyl) benzimidazole | 6.0 |
| Dicalcium phosphate | 1.0 |
| Starch | 0.7 |
| Guar gum | 0.16 |
| Talc | 0.11 |
| Magnesium stearate | 0.28 |

This bolus is prepared by thoroughly mixing the benzimidazole of the particle size finer than 60 mesh with 0.43 gm. of starch in the form of an aqueous starch paste. The resulting mixture is then granulated in the usual manner, passed through a No. 10 mesh screen and dried at about 40–50° C. for about 8 hours. The dried material is then passed through a No. 16 mesh screen after which the guar gum and the balance of the starch are added and the mixture thoroughly blended. The remainder of the ingredients are then added and the entire mass totally mixed. A bolus of the desired size is then prepared in a standard manner by means of compression.

Suitable drenches would contain the following ingredients in about an ounce of drench composition:

(A)

| | | |
|---|---|---|
| 1-methoxy-2-(4'-thiazolyl) benzimidazole | gm | 4.5 |
| Benzalkonium chloride | ml | 0.6 |
| Antifoam emulsion | gm | 0.06 |
| Hydroxyethylcellulose | gm | 0.3 |
| Sodium phosphate monobasic | ml | 0.3 |
| Water to | ml | 30.0 |

(B)

| | | |
|---|---|---|
| 1-methoxy-2-(2'-thiazolyl) benzimidazole | gm | 5.0 |
| Benzalkonium chloride | ml | 0.7 |
| Antifoam emulsion | gm | 0.07 |
| Hydroxyethylcellulose | gm | 0.4 |
| Sodium phosphate Monobasic | gm | 0.4 |
| Water to | ml | 33 |

The levels of anthelmintic in these unit dosage forms may be varied within reasonable limits without altering the amounts of the other ingredients in the composition.

The 1-ether benzimidazoles defined by Formula I above may be administered, dispersed in or admixed with the normal elements of animal sustenance, i.e. the feed, drinking water or other liquids normally partaken by the animals. This method is preferred when it is desired to administer the active compounds continuously, either as a therapeutic or prophylactic agent, for a period of several days or more. However, in such usage, it is to be understood that the present invention also contemplates the employment of compositions containing the active compounds intimately dispersed in or admixed with any other carrier or diluent which is inert with respect to the active ingredient, orally administrable and is tolerated by the animals. Such compositions may be utilized in the form of powders, pellets, suspensions and the like and are adapted to be fed to animals to supply the desired dosage or to be employed as concentrates or supplements and subsequently diluted with additional carrier or feed to produce the ultimate compositions. Example of carriers or diluents suitable for such compositions are solid orally ingestable carriers such as distillers' dried grains, alfalfa, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. In the preparation of solid compositions the active ingredient is intimately dispersed or admixed throughout the feed or other solid carrier by methods such as grinding, stirring, milling or tumbling. By selecting proper diluents and by altering the ratio of carrier to active ingredient, compositions of any desired concentration may be prepared.

When the compounds described according to Formula I above are provided as a constituent of the feed, the required dosage may be supplied with feed compositions containing from about 0.001%–3% by weight of the active compound. Such medicated feed compositions can be prepared for direct use by mixing the above amount of active ingredient directly with the feed. The medicated feeds may also be prepared by the use of feed supplements containing higher concentration of the active ingredient uniformly dispersed in a solid edible carrier such as mentioned above. The feed supplements may then be diluted with the feed to produce the desired concentration of active ingredient for feed. Since it is convenient for the feed manufacturer to use about one pound of feed supplement for each ton of finished feed, the preferred concentration of active ingredient in the feed supplement is partly a function of the level of active ingredient desired in the finished feed. In general, feed supplements containing from about 5% to about 50% by weight of active ingredient may be satisfactorily employed to supply the desired dosage in the finished feed.

Examples of typical feed supplements containing the active compounds dispersed in a solid inert carrier are:

(A)

| | Lbs. |
|---|---|
| 1-methoxy-2-(4'-thiazolyl) benzimidazole | 5 |
| Wheat shorts | 95 |

(B)

| | |
|---|---|
| 1-methoxy-2-(2'-thiazolyl) benzimidazole | 15 |
| Ground oyster shells | 40 |
| Citrus meal | 45 |

(C)

| | |
|---|---|
| 1-benzyloxy-2-(2'-furyl) benzimidazole | 25 |
| Corn meal | 75 |

(D)

| | |
|---|---|
| 1-chloromethoxy-2-(2'-thienyl) - 5 - phenyl benzimidazole | 30 |
| Soybean mill feed | 70 |

(E)

| | |
|---|---|
| 1-ethoxy-2-(4'-thiazolyl) benzimidazole | 15 |
| Molasses solubles | 85 |

In the preparation of these and similar feed supplements, the active ingredient is added to the carrier and the whole mixed to give substantially uniform dispersion of the anthelmintic agent in the carrier.

The following exampes are given for the purpose of illustration and not by way of limitation.

Example 1.—1-methoxy-2-(4'-thiazolyl)-benzimidazole 2-(4'-thiazolyl)-benzimidazole - 1 - oxide (0.651 g.) is added to a solution of 0.12 g. of sodium hydroxide in 6 ml. of methanol. To the clear solltuion is added 0.465 g. of methyliodide and the mixture is heated at 55° to 60° C. for five hours. The solvent is removed in vacuo. The oily residue is diluted with 5 ml. of water and solidifies on standing. 1 - methoxy-2 - (4' - thiazolyl)-benzimidazole is separated by filtration, washed with water and recrystallized from (1:1) methanol-water; M.P. 117–118° C.

When the above process is carried out and 2-phenyl benzimidazole-1-oxide,
2-(2'-fluorophenyl)-benzimidazole-1-oxide,
2-(2'-fluoronaphthyl)-benzimidazole-1-oxide,
2-(2'-thiazolyl)-benzimidazole-1-oxide,
2-(4'-isothiazolyl)-6-(2'-thienyl)-benzimidazole-1-oxide,
2-[4'-(1',2',5'-thiadiazolyl)]-5-methylthio benzimidazole-1-oxide, or 2-(2'-pyrryl) - 5 - phenylthio benzimidazole-1-oxide is used in place of 2-(4'-thiazolyl)benzimidazole-1-oxide, there is obtained 1-methoxy-2-phenyl benzimidazolo,
1-methoxy-2-(2'-fluorophenyl)-benzimidazole,
1-methoxy-2-(2'-fluoronaphthyl)-benzimidazole,
1-methoxy-2-(2'-thiazolyl)-benzimidazole,
1-methoxy-2-(4'-isothiazolyl)-6-(2'-thienyl)-benzimidazole,
1-methoxy-2-[4'-(1',2',5'-thiadiazolyl)]-5-methylthio benzimidazole, or
1-methoxy-2-(2'-pyrryl)-5-phenylthio benzimidazole, respectively.

Example 2.—1-ethoxy-2-(4'-thiazolyl)-benzimidazole

When the procedure described in Example 1 is followed and ethylbromide is used instead of methyl iodide, there is obtained 1-ethoxy-2-(4'-thiazolyl)-benzimidazole.

Similarly, when propyl iodide, dimethylsulfate, diethylsulfate or propyl chloride is used in place of methyl iodide in Example 1, and the reaction mixture is heated to 90° C. instead of 55° to 60° C., there is obtained 1-propoxy-2-(4'-thiazolyl)-benzimidazole,
1-methoxy-2-(4'-thiazolyl)-benzimidazole,
1-ethoxy-2-(4'-thiazolyl)-benzimidazole or 1-propoxy-2-(4'-thiazolyl)-benzimidazole, respectively.

Example 3.—1-methoxy-2-(2'-furyl)-5-phenyl-benzimidazole

A solution of 0.48 g. of sodium hydroxide in 20 ml. of methanol, 2.77 g. of 2-(2'-furyl)-5-phenyl benzimidazole-1-oxide and 1.2 g. of methylbromide are added to a 50 ml. stainless steel autoclave and heated at 80° C. for 8 hours. The contents are then cooled and the reaction mixture is concentrated to approximately 10 ml. and diluted with 20 ml. of water. An oil precipitates and solidifies on standing. It is collected by filtration and the cake is washed with water. The product, 1-methoxy-2-(2'-furyl)-5-phenyl-benzimidazole, is recrystallized from ethanol.

When 2-(3'-thiacoumarinyl)-5-methoxy-benzimidazole-1-oxide, 2-(2'-naphthyl)-5-methyl-benzimidazole-1-oxide, or 2-(3'-coumarinyl)-5-(4'-fluorophenyl)-benzimidazole-1-oxide is used in place of 2-(2'-furyl)-5-phenyl benzimidazole-1-oxide in the above process, there is obtained 1,5-dimethoxy-2-(3'-thiacoumarinyl)-benzimidazole, 1-methoxy-2-(2'-naphthyl)-5-methyl benzimidazole, or 1-methoxy-2-(3'-coumarinyl)-5-(4'-fluorophenyl) - benzimidazole, respectively.

When ethylenechlorohydrin, dibromoethane, acetamido - ethylbromide, dimethylaminoethylchloride, benzene sulfonamido - ethylchloride, methylaminoethylchloride, cyclohexylbromide, or methylbromoacetate is used in place of methylbromide in the above process, there is obtained 1-hydroxyethoxy-2-(2'-furyl)-5-phenyl benzimidazole,
1-bromoethoxy-2-(2'-furyl)-5-phenyl benzimidazole,
1-acetamidoethoxy-2-(2'-furyl)-5-phenyl benzimidazole,
1-dimethylaminoethoxy-2-(2'-furyl)-5-phenyl benzimidazole,
1-benzene sulfonamidoethoxy-2-(2'-furyl)-5-phenyl benzimidazole,
1-methylaminoethoxy-2-(2'-furyl)-5-phenyl benzimidazole,
1-cyclohexoxy-2-(2'-furyl)-5-phenyl benzimidazole, or 1-carbomethoxymethoxy-2-(2'-furyl)-5-phenyl benzimidazole, respectively.

Example 4.—1,5-dimethoxy-2-(2'-thiazolyl)-benzimidazole

To a solution of 0.61 g. of potassium hydroxide in 15 ml. of methanol is added 2.44 g. of 2-(2'-thiazolyl)-5-methoxy benzimidazole-1-oxide. The mixture is stirred until a clear solution is formed. Dimethylsulfate (6.16 g.) is added dropwise. The reaction mixture is heated under reflux for 4 hours. The solvent is removed in vacuo and the residue is diluted with 20 ml. of water. The precipitated 1,5-dimethoxy-2-(2'-thiazolyl)-benzimidazole is filtered, washed with water and purified by recrystallization from isopropanol-water (2:1).

When the above process is carried out and 2-(3'-pyridyl) - 6 - fluoro benzimidazole - 1 - oxide, 2 - (4' - thiazolyl) - 5 - phenyl benzimidazole - 1 - oxide, or 2 - (2'-thienyl) - 5 - phenoxy benzimidazole - 1 - oxide is used in place of 2 - (2' - thiazolyl) - 5 - methoxy benzimidazole - 1 - oxide, there is obtained 1 - methoxy - 2 - (3'- pyridyl) - 6 - fluoro benzimidazole, 1 - methoxy - 2-(4' - thiazolyl) - 5 - phenyl benzimidazole, or 1 - methoxy - 2 - (2' - thienyl) - 5 - phenoxy benzimidazole, respectively.

When the above process or that of Examples 1–3 is carried out and sulfonates rather than sulfates or halides are employed to alkylate the benzimidazole oxides, the 1-ether benzimidazoles are again obtained.

Example 5.—1-methoxy-2-(2'-fluorophenyl)-benzimidazole 2-(2'-Fluorophenyl)-benzimidazole-1-oxide (0.80 g.) is dissolved in 15 ml. of methanol. About a 20% excess of diazomethane in 5 ml. of ethyl ether is added and the mixture is allowed to stand for 1 hour at room temperature. The solvent is removed in vacuo and the residue is recrystallized from isopropanol-ethylacetate to give 1-methoxy-2-(2'-fluorophenyl)-benzimidazole.

When the above process is carried out and 2-phenylbenzimidazole-1-oxide,
2-(2'-fluoroanaphthyl)-benzimidazole-1-oxide,
2-(4'-thiazolyl)-benzimidazole-1-oxide,
2-(2'-thiazolyl)-benzimidazole-1-oxide,
2-(4'-isothiazolyl)-6-thienyl benzimidazole-1-oxide,
2-[4'-(1',2',5'-thiazolyl)]-5-methylthiobenzimidazole-1-oxide,
2-(2'-pyrryl)-5-phenylthio benzimidazole-1-oxide,
2-(3'-thiacoumarinyl)-5-methoxy benzimidazole-1-oxide,
2-(2'-naphthyl)-5-methyl benzimidazole-1-oxide,
2-(3'-coumarinyl)-5-(4'-fluorophenyl)-benzimidazole-1-oxide,
2-(3'-pyridyl)-6-fluoro benzimidazole-1-oxide,
2-(4'-thiazolyl)-5-phenyl benzimidazole-1-oxide, or 2-(2'-thienyl)-5-phenoxy benzimidazole-1-oxide is used in place of 2-(2'-fluorophenyl)-benzimidazole-1-oxide, there is obtained 1-methoxy-2-phenyl benzimidazole, 1-methoxy-2-(2'-fluoronaphthyl)-benzimidazole,
1-methoxy-2-(4'-thiazolyl-benzimidazole,
1-methoxy-2-(2'-thiazolyl)-benzimidazole,
1-methoxy-2-(4'-isothiazolyl)-6-(2'-thienyl)-benzimidazole,
1-methoxy-2-[4-(1', 2', 5'-thiadiazolyl)]-5-methylthio benzimidazole,
1-methoxy-2-(2'-pyrryl)-5-phenylthio benzimidazole,
1,5-dimethoxy-2-(3'-thiacoumarinyl)-benzimidazole,
1-methoxy-2-(2'-naphthyl)-5-methyl benzimidazole,
1-methoxy-2-(3'-coumarinyl)-5-(4'-fluorophenyl)-benzimidazole,
1-methoxy-2-(3'-pyridyl)-6-fluoro benzimidazole,
1-methoxy-2-(4'-thiazolyl)-5-phenyl benzimidazole, or
1-methoxy-2-(2'-thienyl)-5-phenoxy benzimidazole, respectively.

When diazoethane, phenyldiazomethane or 2 - chloro-1-diazoethane is used in place of diazomethane in the above reaction, there is obtained 1-ethoxy-2-(2'-fluorophenyl)-benzimidazole,
1-benzyloxy-2-(2'-fluorophenyl)-benzimidazole, or
1-β-chloroethoxy-2-(2'-fluorophenyl)-benzimidazole, respectively.

Example 6.—1-benzyloxy-2-(4'-thiazoyl)-benzimidazole

To a mixture of 8 ml. of tetrahydrofuran and 0.15 ml. of potassium hydroxide (5 N) is added 0.7 g. of 2-(4'-thiazolyl) benzimidazole-1-oxide. 1.1 g. of benzyl iodide is then added and the mixture is heated at 60–65° C. for about four hours. The solvent is evaporated and water is added to the residue to crystallize 1-benzyloxy-2-(4'-thiazolyl)-benzimidazole.

When the above process is carried out and 4-benzene sulfonamidobenzyl chloride, 4-acetamedobenzyl chloride, α-chloro - 2 - xylene, 4 - fluorobenzyl chloride, or 4-nitrobenzyl bromide is used in place of benzyl iodide, there is obtained 1-(4'-benzene sulfonamidobenzyloxy)-2-(4'-thiazolyl)-benzimidazole,
1-(4'-acetamidobenzyloxy)-2-(4'-thiazolyl)-benzimidazole,
1-(2'-methylbenzyloxy)-2-(4'-thiazolyl)-benzimidazole,
1-(4'-fluorobenzyloxy)-2-(4'-thiazolyl)-benzimidabzole, or 1-(4'-nitrobenzyloxy)-2-(4'-thiazolyl)-benzimidazole, respectively.

0.3 g. of 1-(4'-acetamidobenzyloxy)-2-(4'-thiazolyl) benzimidazole is converted to 1-(4'-aminobenzyloxy)-2-(4'-thiazolyl)-benzimidazole by treatment with 0.1 N sodium hydroxide at 70° C. for one hour. Other benzimidazoles having an acetamido moiety are converted to the corresponding amino compound in the same manner.

Example 7.—1-carboxymethoxy-2-(4'-thiazolyl)-benzimidazole 2-(4'-thiazolyl)-benzimidazole-1-oxide (0.651 g.) is added to a solution of 0.24 g. of sodium hydroxide and four drops of water in 10 ml. of methanol. 0.28 g. of chloroacetic acid is added and the mixture is refluxed for five hours. The white insoluble sodium salt of 1-carboxymethoxy-2-(4'-thiazolyl)-benzimidazole is collected by filtration. The filtrate is evaporated to dryness and the resulting crude residue is combined with the filtered insoluble salt. This material is then dissolved in water and acidified with acetic acid to give needle-shaped crystals of 1 - carboxymethoxy - 2-(4'-thiazolyl)-benzimidazole; M.P. 204–205° C. with decomposition.

Example 8.—2-(4'-thiazolyl)-benzimidazole-1-oxide

To a solution of 24.92 gm. of N-(o-nitrophenyl)-thiazole-4-carboxamide in 350 ml. of methylene chloride is added 27.6 gm. of sodium hydrosulfide dihydrate in 200 ml. of water over two hours at 5° C. Calcium chloride (10.0 gm.) in 20 ml. of water is then added and the mixture is stirred vigorously at 5° C. for 6 hours and at room temperature for 18 hours. After addition of 10 gm. of ammonium chloride and one hour of stirring, the solid is filtered and washed with water. It is then dissolved in 200 ml. water by addition of 10% hydrochloric acid until pH 1.2 is achieved. Insoluble impurities are filtered off and the pH of the clear filtrate is adjusted to pH 7 by addition of 6 N ammonium hydroxide. The precipitate is filtered, washed with water and dried in vacuo. Substantially pure 2-(4'-thiazolyl)-benzimidazole-1-oxide is obtained by recrystallization of the crude material from ethanol; M.P. 237–238° C.

Example 9.—2-phenyl benzimidazole-1-oxide

To a solution of 13.3 gm. of sodium hydrosulfide dihydrate in 130 ml. of water is added 12.1 gm. of o-nitrobenzanilide in 100 ml. of benzene. The reaction mixture is cooled to 10° C. and 10 gm. of calcium chloride in 20 ml. of water is added. The heterogeneous mixture is stirred vigorously for 20 hours at room temperature.

Ammonium chloride (10 gm.) is then added and the mixture is stirred for one additional hour. The solid is filtered and washed with two 10 ml. portions of water and then with two 5 ml. portions of benzene. The crude product is recyrstallized from methanol ethylacetate (1:1) giving substantially pure 2-phenyl benzimidazole-1-oxide; M.P. 225° C.

Example 10

To 50 ml. of dry toluene is added 60 gm. of a compound of the formula

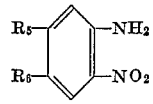

where R$_5$ and R$_6$ are hydrogen, loweralkyl, halo, phenyl, halophenyl, thienyl, loweralkoxy, loweralkylthio, phenoxy or phenylthio, and 10 ml. of a compound of the formula R—COCl where R is aryl, halophenyl, thenyl, furyl, pyrryl, pyridyl, coumarinyl, thiacoumarinyl, thiazolyl, isothiazolyl or thiadiazolyl. The solution is heated at reflux for one hour. The solvent is removed under vacuum, benzene is added to the residue, then evaporated and added and evaporated once again. The remaining solid is filtered and washed with n-butanol. The filtrate is diluted with ether to obtain a compound of the formula

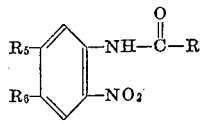

where R, $R_5$ and $R_6$ are as defined above.

The methods described in Examples 8–10 above are intended for the purpose of disclosing methods generally applicable in preparing starting materials and are not considered embraced by the present invention. The processes of Examples 8 and 9 are the invention of J. M. Chemerda, G. Gal, and M. Sletzinger which invention is embraced by patent application Ser. No. 422,489 filed by them on Dec. 31, 1964, now abandoned.

It should be understood that although this invention has been described with reference to particular embodiments thereof, changes and modifications may be made which are within its intended scope.

What is claimed is:

1. A benzimidazole of the formula:

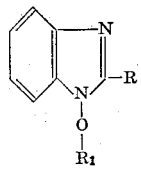

where R is thiazolyl and $R_1$ is loweralkyl or carboxyloweralkyl.

2. 1-methoxy-2-(4'-thiazolyl)-benzimidazole.
3. 1-methoxy-2-(2'-thiazolyl)-benzimidazole.
4. 1-ethoxy-2-(4'-thiazolyl)-benzimidazole.

References Cited

UNITED STATES PATENTS 3,017,415   1/1962   Sarett et al. _____ 260—302

OTHER REFERENCES

Stacy et al.: J. Org. Chem., vol. 29 (6–64), pp. 1537–40.

Takahashi et al.: Chem. Pharm. Bull. vol. 12 (1964), pp. 282–91.

ALEX MAZEL, *Primary Examiner.*

R. J. GALLAGHER, *Assistant Examiner.*

U.S. Cl. X.R.

424—270; 260—295, 296,295.5, 309.2, 326.3, 330.5, 332.2, 343.2, 347.3, 558